Aug. 1, 1950 — C. H. MATSON — 2,517,224
FISHING REEL SEAT
Filed Feb. 6, 1947 — 2 Sheets-Sheet 1
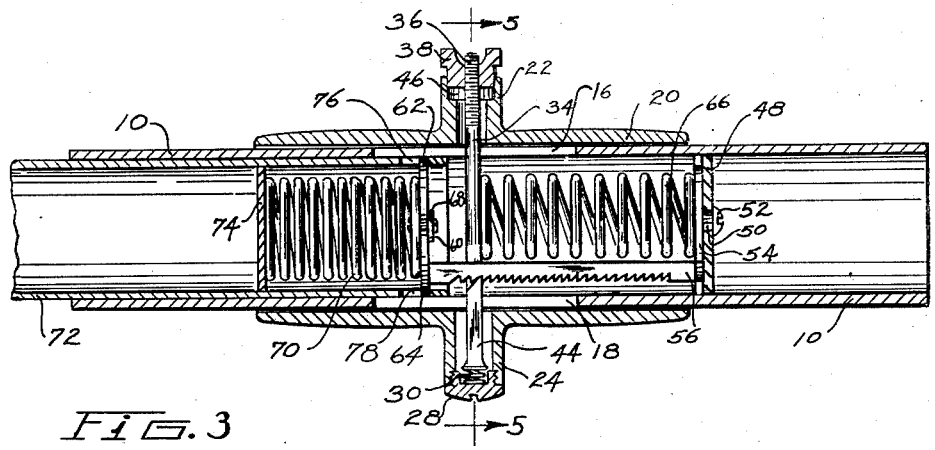
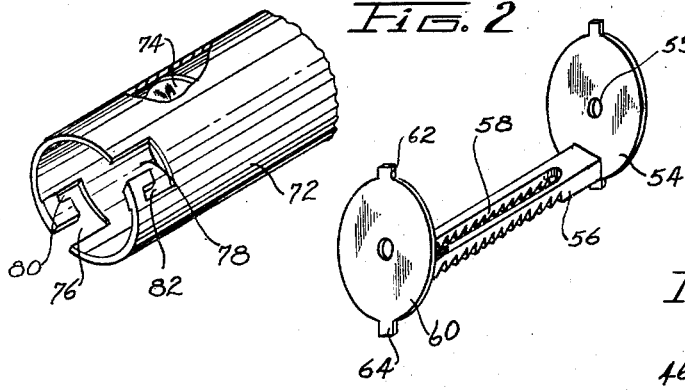
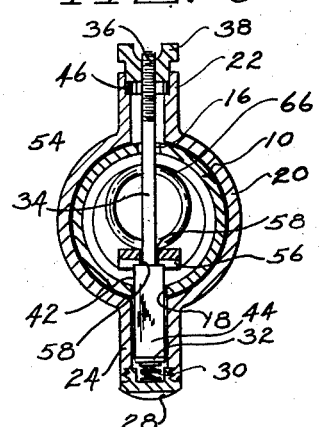
INVENTOR.
CHARLES H. MATSON
BY Russell & Squire
ATTORNEYS Aug. 1, 1950 C. H. MATSON 2,517,224
FISHING REEL SEAT
Filed Feb. 6, 1947 2 Sheets-Sheet 2
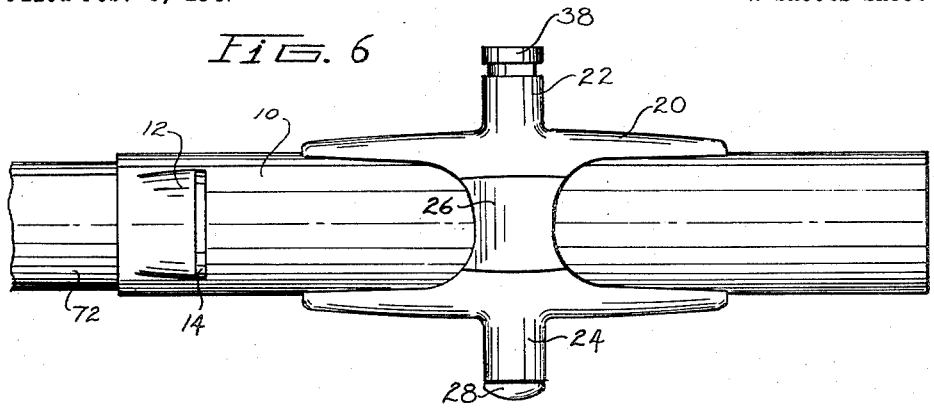
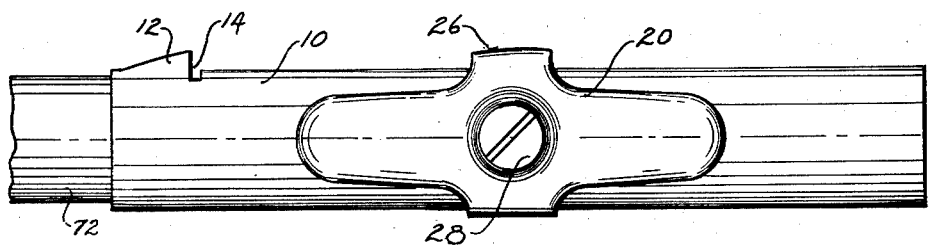
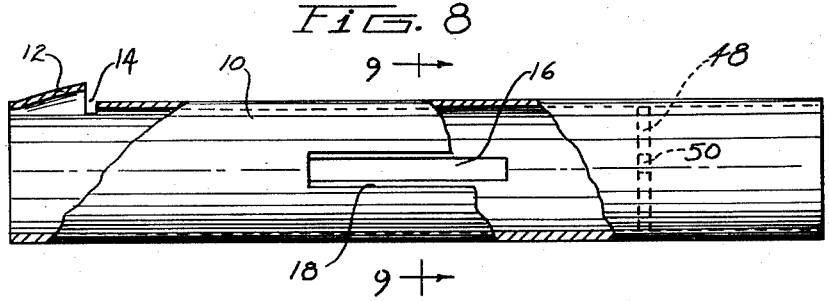
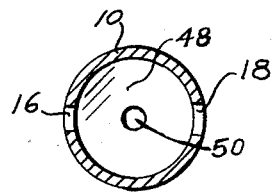
INVENTOR.
CHARLES H. MATSON
BY
Russell & Squire
ATTORNEYS Patented Aug. 1, 1950

2,517,224

UNITED STATES PATENT OFFICE 2,517,224

FISHING REEL SEAT

Charles H. Matson, New York, N. Y.

Application February 6, 1947, Serial No. 726,908

5 Claims. (Cl. 43—22)

The present invention relates to fishing reel seats and it consists in the combinations, constructions and arrangements of parts herein described and claimed. The applicant is the owner of U. S. Patent No. 2,479,952, granted August 23, 1949, on an application filed April 26, 1946, and bearing Serial No. 665,225.

The invention contemplates the provision of a fishing reel seat for fishing rods and comprises generally a substantially cylindrical body having a stationary member adapted to grip one end of the base of a conventional reel and having a second substantially cylindrically shaped member formed with a lip adapted to engage another end of the base of the reel and an automatically locking, finger releasable latch for latching the two cylindrical members and the base of the reel and a means is provided for locking the latch mechanism in any desired position. A novel latch is also provided by the above mechanism for joining the fishing rod proper and the handle portion thereof.

It is accordingly an object of the invention to provide an automatic latching mechanism for the base of a fishing reel.

Another object of the invention is the provision of a simple, finger operated releasing means for an automatically operated latching mechanism.

Another object of the invention is the provision of a lock for latching mechanism such as above set forth, which will lock the latching mechanism in any desired position.

A further object of the invention is the provision of a device of this kind which will be simple and efficient in operation but which will be inexpensive to manufacture and, at the same time, provides for sturdy construction.

Other and further objects of the invention will become apparent from a reading of the following specification taken in conjunction with the drawings, in which:

Figure 1 is a sectional plan view of a device embodying the invention,

Figures 2 to 4, inclusive, are isometric views, respectively, a ratchet bar, a rod-engaging member, and a shaft, all forming parts of the invention, Figure 5 is a sectional view taken along line 5—5 of Figure 1, Figure 6 is a plan view of a completely assembled device embodying the invention, Figure 7 is a side elevational view of the device shown in Figure 6.

Figure 8 is an elevational view, partly broken away, of a hollow cylindrical member forming a part of the invention, and Figure 9 is a sectional view taken along line 9—9 of Figure 8.

Referring more particularly to the drawings, there is shown therein a cylindrical member 10 adapted to be carried by or forming a part of the handle or butt of a fishing rod and having a transversely extending gripping lip formed integrally therewith and having a transversely extending slot 14 cut therein adjacent the lip 12 and a pair of diametrically opposed longitudinal slots 16 and 18 formed in the central portion thereof.

Slidably mounted upon the member 10 is a latch housing 20 having a pair of diametrically opposed hollow handles 22 and 24 preferably formed integrally therewith and having a transversely extending gripping lip 26.

The handle 24 is provided with a threaded cover 28 which is adapted to contain a short compression spring 30 against which bears the rounded end 32 of a shaft 34 which extends through the slots 16 and 18 into the handle 22 where it is engaged by means of threads 36 to a nut 38. The shaft is formed with a squared portion 40 adjacent its rounded end and this portion has integrally formed therewith a pair of pawls 42 and 44.

The handle 22 is provided with a seat 46 for the reception and for limiting the inward movement of the nut 38. The member 10 has permanently affixed therein a bulkhead 48 having a centrally disposed opening 50. Affixed forwardly of the bulkhead 48 by means of a bolt 52 or the like is a circular plate 54 having a centrally disposed opening 55 to which is affixed adjacent the periphery thereof a longitudinally extending ratchet bar 56 having a centrally disposed slot 58 formed therein.

To the other end of the bar 56 is permanently attached a circular plate 60 having a pair of outwardly extending diametrically opposed ears 62 and 64. The bolt 52 also holds in position a forwardly and longitudinally extending compression spring 66 which is adapted to have its free end bear against the shaft 34 and the plate 60 has attached to it by means of a bolt 68 or the like a compression spring 70.

A cylindrically shaped rod engaging member 72 is provided with a permanently affixed bulkhead 74 against which the free end of the spring 70 is adapted to bear when the device is in assembled condition and the rearward end of the member 72 is provided with a pair of diametrically opposed bayonet slots 76 and 78 provided with locking slots 80 and 82, respectively.

It will be understood that a fishing rod will be inserted in and carried by the member 72 and that the member 10 will have either inserted therein or form a part of the butt or handle of the fishing rod.

In operation, it will be apparent that the member 72 is first inserted into the member 10 until the spring 70 bears against the bulkhead 74 whereupon pressure is brought to bear until the spring is compressed and the ears 62 and 64 pass into the bayonet slots 76 and 78. The member 72 is then turned until the ears register with the locking slots 80 and 82 whereupon pressure is released and the spring 70 will cause the ears to lock in the locking slots.

Pressure is now applied by the operator's finger upon the nut 38 which will cause an inward movement of the shaft 34 and consequent disengagement of the pawls 42 and 44 from the teeth of the ratchet bar 56. The latch housing 20 may now be moved rearwardly against the action of the spring 66 and one end of the base of a fishing reel (not shown) may be inserted beneath the fixed engaging lip 12.

If desired, the housing may be locked in this position by turning the nut 38 until pressure upon its inner face against the seat 46 causes the pawls to be held against the bar 56.

Ordinarily, however, the operator will release the pressure upon the nut 38 whereupon the spring 66 will exert pressure upon the shaft 34 and bulkhead 48 to cause a forward movement of the housing 20 until the lip 26 engages the other end of the base of the fishing reel, the pawls meanwhile riding over the teeth of the bar 56 due to the fact that their points extend rearwardly. It will be seen, also, that rearward movement of the housing is prevented by the arrangement of the pawls and the cut of the teeth of the ratchet bar. Thus it will be seen that the fishing reel base may be latched to the fishing rod by a simple operation and that it may then be securely locked against accidental displacement by means of the locking nut 38.

While but one form of the invention has been shown and described herein, it will be readily apparent to those skilled in the art that many minor modifications may be made without departing from the spirit of the invention or the scope of the appended claims.

What is claimed is:

1. A device of the character described comprising a hollow cylindrical member having an outwardly extending reel base engaging lip adjacent its forward end and having a pair of diametrically opposed longitudinally extending slots formed therein, a bulkhead affixed within the cylindrical member adjacent the rear thereof, a rear plate detachably secured to the forward side of the bulkhead, a forward plate, a ratchet bar rigidly interconnecting the plates, a latch housing slidably mounted upon the cylindrical member, a reel base engaging lip formed on said latch housing, a pair of diametrically opposed hollow ears formed integrally with the latch housing, a shaft extending through the longitudinal slots and into said hollow ears, a pawl formed on said shaft, a compression spring in one hollow ear for urging the pawl into engagement with the ratchet bar and a compression spring interposed between the shaft and the rear plate.

2. A device as claimed in claim 1 wherein there is provided means for locking the pawl in engagement with the ratchet bar.

3. A device as defined in claim 1 having means for locking the pawl in engagement with the ratchet bar, said means comprising a threaded end for the shaft in the hollow ear opposite the spring-carrying hollow ear and a nut mounted upon the threaded end of the shaft and seated in said last mentioned hollow ear.

4. A device of the character described comprising a hollow cylindrical member having an outwardly extending reel base engaging lip adjacent its forward end and having a pair of diametrically opposed longitudinally extending slots formed therein, a bulkhead affixed within the cylindrical member adjacent the rear thereof, a rear plate detachably secured to the forward side of the bulkhead, a forward plate, a ratchet bar rigidly interconnecting the plates, a latch housing slidably mounted upon the cylindrical member, a reel base engaging lip formed on said latch housing, a pair of diametrically opposed hollow ears formed integrally with the latch housing, a shaft extending through the longitudinal slots and into said hollow ears, a pawl formed on said shaft, a compression spring in one hollow ear for urging the pawl into engagement with the ratchet, a compression spring interposed between the shaft and the rear plate, means for locking the pawl in engagement with the ratchet bar, a cylindrical rod-engaging member and means for releasably connecting the rod-engaging member to the forward plate within the hollow cylindrical member.

5. A device as defined in claim 4 wherein said last named means includes a pair of ears formed on the forward plate, a pair of bayonet slots formed in the rod-engaging member and adapted to receive said ears, a wall formed within the rod-engaging member and a compression spring affixed to the outer face of the forward plate and engageable with said wall when the rod-engaging member is inserted into said hollow cylindrical member.

CHARLES H. MATSON.

REFERENCES CITED

The following references are of record in the file of this patent:

UNITED STATES PATENTS

| Number | Name | Date |
| --- | --- | --- |
| 1,711,248 | Powell | Apr. 30, 1929 |
| 2,431,972 | Treadway et al. | Dec. 2, 1947 |
| 2,479,952 | Matson | Aug. 23, 1949 |